(12) United States Patent
Su et al.

(10) Patent No.: US 10,928,247 B2
(45) Date of Patent: Feb. 23, 2021

(54) SYSTEM AND METHOD FOR DETECTING ILLUMINANCE HAVING A LIGHT SENSOR COMPRISING A LIGHT EMITTING DIODE RECEIVING A RAY OF LIGHT AND GENERATING A SENSING VOLTAGE

(71) Applicant: NATIONAL APPLIED RESEARCH LABORATORIES, Taipei (TW)

(72) Inventors: Fang-Ci Su, Hsinchu (TW); Hsin-Yi Tsai, Hsinchu (TW); Min-Wei Hung, Hsinchu (TW); Yi-Cheng Lin, Hsinchu (TW); Kuo-Cheng Huang, Hsinchu (TW); Hsin-Su Yu, Hsinchu (TW); Chiou-Lian Lai, Hsinchu (TW); Chung-Yao Hsu, Hsinchu (TW); Chao-Hung Cheng, Hsinchu (TW); Li-Wei Kuo, Hsinchu (TW)

(73) Assignee: NATIONAL APPLIED RESEARCH LABORATORIES, Taipei (TW)

( * ) Notice: Subject to any disclaimer, the term of this patent is extended or adjusted under 35 U.S.C. 154(b) by 102 days.

(21) Appl. No.: 16/288,092

(22) Filed: Feb. 27, 2019

(65) Prior Publication Data

US 2019/0383660 A1  Dec. 19, 2019

(30) Foreign Application Priority Data

Jun. 15, 2018 (TW) ................. 107120845

(51) Int. Cl.
*G01J 1/42* (2006.01)
*G01J 1/44* (2006.01)

(52) U.S. Cl.
CPC ............... *G01J 1/44* (2013.01); *G01J 1/4204* (2013.01); *G01J 2001/446* (2013.01)

(58) Field of Classification Search
CPC ........ G01J 1/42; G01J 1/44; G01J 2001/4252; G01J 2001/4446; G01J 2001/446
USPC .......................................... 250/214.1, 214 R
See application file for complete search history.

(56) References Cited

U.S. PATENT DOCUMENTS 4,274,735 A * 6/1981 Tamura .................. G01S 17/08
250/214 B \* cited by examiner

*Primary Examiner* — Que Tan Le
(74) *Attorney, Agent, or Firm* — Cheng-Ju Chiang

(57) ABSTRACT

A system for detecting an illuminance of the present invention includes a light source, a light sensor, and a signal output module. The light source includes a first A light-emitting diode, the first A light-emitting diode having a first color light; and the light source emits a first ray of light. The light sensor has a sensing face; the light sensor includes a first B light-emitting diode disposed on the sensing face, the first B light-emitting diode having the first color light; and the light sensor receives at least a portion of the first ray of light and generates a first sensing voltage. The signal output module is coupled to the light sensor to receive the first sensing voltage and output a sensing result signal according to the first sensing voltage.

24 Claims, 15 Drawing Sheets

SYSTEM AND METHOD FOR DETECTING ILLUMINANCE HAVING A LIGHT SENSOR COMPRISING A LIGHT EMITTING DIODE RECEIVING A RAY OF LIGHT AND GENERATING A SENSING VOLTAGE

BACKGROUND

Technical Field

The present invention relates to a system and method for detecting an illuminance.

Related Art

Light-emitting diode (LED) light sources are widely used in biomedical industries, such as plant cultivation, animal growth and reproduction, medical treatment, etc. Many scholars have studied the use of light-emitting diodes in phototherapies. They modulated characteristics of LEDs, such as light intensity and wavelength, so that they become important tools for medical procedures.

In the field of photodetection, common apparatuses for detecting light intensity and wavelength are photodiodes (PD) and spectrometers. Spectrometers are configured to measure a wavelength of light, but it results in increased costs and measurement complexity of elements and components. On the contrary, PDs are configured to detect total intensity of rays of light, but cannot detect intensity of light at a specific wavelength, and the PDs have a relatively poor wavelength selectivity.

On the other hand, most detection apparatuses are still a combination of a wearable device and a large detection apparatus. The wearable device is likely to cause safety and health problems and patients' discomfort, and the large detection apparatus is likely to cause inconvenience in detection.

SUMMARY

In view of the above, an object of the present invention is to provide a system and method for detecting an illuminance to improve correctness and efficiency of illuminance detection.

A system for detecting an illuminance of the present invention includes a light source, a light sensor, and a signal output module. The light source includes a first A light-emitting diode (LED), the first A light-emitting diode having a first color light; and the light source emits a ray of light. The light sensor has a sensing face; the light sensor includes a first B light-emitting diode disposed on the sensing face, the first B light-emitting diode having the first color light; and the light sensor receives at least a portion of the first ray of light and generates a first sensing voltage. The signal output module is coupled to the light sensor to receive the first sensing voltage and output a sensing result signal according to the first sensing voltage.

In an embodiment of the present invention, the signal output module includes an amplification unit, the amplification unit amplifying the first sensing voltage to form the sensing result signal.

In an embodiment of the present invention, the system for detecting an illuminance further includes a display device coupled to the signal output module, the display device displaying a sensing result according to the sensing result signal.

In an embodiment of the present invention, the system for detecting an illuminance further includes a calculation unit coupled to the signal output module.

In an embodiment of the present invention, the light source is at a first distance from the light sensor, the first color light is a red light, and when the first distance is 100 cm, the calculation unit further calculates a distance illuminance percentage of an illuminance when the light sensor is at a second distance relative to an illuminance when the light sensor is at the first distance according to the following equation (1);

$$I_R = 9.271 + \frac{899186.745}{L^2} \qquad \text{Equation (1)}$$

where $I_R$ is the distance illuminance percentage, and L is the second distance.

In an embodiment of the present invention, the light source is at a first distance from the light sensor, the first color light is a green light, and when the first distance is 100 cm, the calculation unit further calculates a distance illuminance percentage of an illuminance when the light sensor is at a second distance relative to an illuminance when the light sensor is at the first distance according to the following equation (2);

$$I_G = 18.291 + \frac{781952.998}{L^2} \qquad \text{Equation (2)}$$

where $I_G$ is the distance illuminance percentage, and L is the second distance.

In an embodiment of the present invention, the light source is at a first distance from the light sensor, the first color light is a blue light, and when the first distance is 100 cm, the calculation unit further calculates a distance illuminance percentage of an illuminance when the light sensor is at a second distance relative to an illuminance when the light sensor is at the first distance according to the following equation (3);

$$I_B = 15.739 + \frac{828976.281}{L^2} \qquad \text{Equation (3)}$$

where $I_B$ is the distance illuminance percentage, and L is the second distance.

In an embodiment of the present invention, the light source is at a first angle relative to a normal line of the sensing face, the first color light is a red light, and when the first angle is 0, the calculation unit further calculates a rotation illuminance percentage of an illuminance when the light sensor rotates with respect to the light source for a second angle relative to an illuminance when the light sensor is at the first angle according to the following equation (4);

$$I_R = -4.34778 + 103.828 \times \cos \theta_R \qquad \text{Equation (4)}$$

where $I_R$ is the rotation illuminance percentage, and $\theta_R$ is the second angle.

In an embodiment of the present invention, the light source is at a first angle relative to a normal line of the sensing face, the first color light is a green light, and when the first angle is 0, the calculation unit further calculates a rotation illuminance percentage of an illuminance when the light sensor rotates with respect to the light source for a second angle relative to an illuminance when the light sensor is at the first angle according to the following equation (5);

$$I_G = 3.27932 + 89.885 \times \cos \theta_R \quad \text{Equation (5)}$$

where $I_G$ is the rotation illuminance percentage, and $\theta_R$ is the second angle.

In an embodiment of the present invention, the light source is at a first angle relative to a normal line of the sensing face, the first color light is a blue light, and when the first angle is 0, the calculation unit further calculates a rotation illuminance percentage of an illuminance when the light sensor rotates with respect to the light source for a second angle relative to an illuminance when the light sensor is at the first angle according to the following equation (6);

$$I_B = 0.15324 + 99.018 \times \cos \theta_R \quad \text{Equation (6)}$$

where $I_B$ is the rotation illuminance percentage, and $\theta_R$ is the second angle.

In an embodiment of the present invention, the light source is at a first angle relative to a normal line of the sensing face, the first color light is a red light, and when the first angle is 0, the calculation unit further calculates a revolution illuminance percentage of an illuminance sensed by the light sensor when the light source revolves with respect to the light sensor for a second angle relative to an illuminance when the light sensor is at the first angle according to the following equation (7);

$$I_R = 8.136 + 96.722 \times \cos \theta_S \quad \text{Equation (7)}$$

where $I_R$ is the revolution illuminance percentage, and $\theta_S$ is the second angle.

In an embodiment of the present invention, the light source is at a first angle relative to a normal line of the sensing face, the first color light is a green light, and when the first angle is 0, the calculation unit further calculates a revolution illuminance percentage of an illuminance sensed by the light sensor when the light source revolves with respect to the light sensor for a second angle relative to an illuminance when the light sensor is at the first angle according to the following equation (8);

$$I_G = 24.338 + 89.349 \times \cos \theta_S \quad \text{Equation (8)}$$

where $I_G$ is the revolution illuminance percentage, and $\theta_S$ is the second angle.

In an embodiment of the present invention, the light source is at a first angle relative to a normal line of the sensing face, the first color light is a blue light, and when the first angle is 0, the calculation unit further calculates a revolution illuminance percentage of an illuminance sensed by the light sensor when the light source revolves with respect to the light sensor for a second angle relative to an illuminance when the light sensor is at the first angle according to the following equation (9);

$$I_B = -1.44975 + 108.755 \times \cos \theta_S \quad \text{Equation (9)}$$

where $I_B$ is the revolution illuminance percentage, and $\theta_S$ is the second angle.

In an embodiment of the present invention, the light source further includes a second A light-emitting diode and a third A light-emitting diode. The second A light-emitting diode has a second color light, and the third A light-emitting diode has a third color light. The light sensor further includes a second B light-emitting diode and a third B light-emitting diode. The second B light-emitting diode is disposed on the sensing face, and the second B light-emitting diode has the second color light. The third B light-emitting diode is disposed on the sensing face, and the third B light-emitting diode has the third color light.

A method for detecting an illuminance of the present invention includes: providing, by a light source, a first ray of light, where the light source includes a first A light-emitting diode (LED), the first A light-emitting diode having a first color light; receiving, by a light sensor, at least a portion of the first ray of light and generating a first sensing voltage, where the light sensor has a sensing face, and the light sensor includes a first B light-emitting diode disposed on the sensing face, the first B light-emitting diode having the first color light; and receiving, by a signal output module, the first sensing voltage and outputting a sensing result signal according to the first sensing voltage, where the signal output module is coupled to the light sensor.

In an embodiment of the present invention, the light source is at a first distance from the light sensor, the first color light is a red light, and when the first distance is 100 cm, the system for detecting an illuminance further includes a calculation unit coupled to the signal output module, the method for detecting an illuminance further includes:

calculating, by the calculation unit, a distance illuminance percentage of an illuminance when the light sensor is at a second distance relative to an illuminance when the light sensor is at the first distance according to the following equation (1);

$$I_R = 9.271 + \frac{899186.745}{L^2} \quad \text{Equation (1)}$$

where $I_R$ is the distance illuminance percentage, and L is the second distance.

In an embodiment of the present invention, the light source is at a first distance from the light sensor, the first color light is a green light, and when the first distance is 100 cm, the system for detecting an illuminance further includes a calculation unit coupled to the signal output module, the method for detecting an illuminance further includes:

calculating, by the calculation unit, a percentage of an illuminance when the light sensor is at a second distance relative to an illuminance when the light sensor is at the first distance according to the following equation (2);

$$I_G = 18.291 + \frac{781952.998}{L^2} \quad \text{Equation (2)}$$

where $I_G$ is the distance illuminance percentage, and L is the second distance.

In an embodiment of the present invention, the light source is at a first distance from the light sensor, the first color light is a blue light, and when the first distance is 100 cm, the system for detecting an illuminance further includes a calculation unit coupled to the signal output module, the method for detecting an illuminance further includes:

calculating, by the calculation unit, a percentage of an illuminance when the light sensor is at a second distance relative to an illuminance when the light sensor is at the first distance according to the following equation (3);

$$I_B = 15.739 + \frac{828976.281}{L^2} \quad \text{Equation (3)}$$

where $I_B$ is the distance illuminance percentage, and L is the second distance.

In an embodiment of the present invention, the light source is at a first angle relative to a normal line of the sensing face, the first color light is a red light, and when the first angle is 0, the system for detecting an illuminance further includes a calculation unit coupled to the signal output module, the method for detecting an illuminance further includes:

calculating, by the calculation unit, a rotation illuminance percentage of an illuminance when the light sensor rotates with respect to the light source for a second angle relative to an illuminance when the light sensor is at the first angle according to the following equation (4);

$$I_R = -4.34778 + 103.828 \times \cos\theta_R \qquad \text{Equation (4)}$$

where $I_R$ is the rotation illuminance percentage, and $\theta_R$ is the second angle.

In an embodiment of the present invention, the light source is at a first angle relative to a normal line of the sensing face, the first color light is a green light, and when the first angle is 0, the system for detecting an illuminance further includes a calculation unit coupled to the signal output module, the method for detecting an illuminance further includes:

calculating, by the calculation unit, a rotation illuminance percentage of an illuminance when the light sensor rotates with respect to the light source for a second angle relative to an illuminance when the light sensor is at the first angle according to the following equation (5);

$$I_G = 3.27932 + 89.885 \times \cos\theta_R \qquad \text{Equation (5)}$$

where $I_G$ is the rotation illuminance percentage, and $\theta_R$ is the second angle.

In an embodiment of the present invention, the light source is at a first angle relative to a normal line of the sensing face, the first color light is a blue light, and when the first angle is 0, the system for detecting an illuminance further includes a calculation unit coupled to the signal output module, the method for detecting an illuminance further includes:

calculating, by the calculation unit, a rotation illuminance percentage of an illuminance when the light sensor rotates with respect to the light source for a second angle relative to an illuminance when the light sensor is at the first angle according to the following equation (6);

$$I_B = 0.15324 + 99.018 \times \cos\theta_R \qquad \text{Equation (6)}$$

where $I_B$ is the rotation illuminance percentage, and $\theta_R$ is the second angle.

In an embodiment of the present invention, the light source is at a first angle relative to a normal line of the sensing face, the first color light is a red light, and when the first angle is 0, the system for detecting an illuminance further includes a calculation unit coupled to the signal output module, the method for detecting an illuminance further includes:

calculating, by the calculation unit, a revolution illuminance percentage of an illuminance sensed by the light sensor when the light source revolves with respect to the light sensor for a second angle relative to an illuminance when the light sensor is at the first angle according to the following equation (7);

$$I_R = 8.136 + 96.722 \times \cos\theta_S \qquad \text{Equation (7)}$$

where $I_R$ is the revolution illuminance percentage, and $\theta_S$ is the second angle.

In an embodiment of the present invention, the light source is at a first angle relative to a normal line of the sensing face, the first color light is a green light, and when the first angle is 0, the system for detecting an illuminance further includes a calculation unit coupled to the signal output module, the method for detecting an illuminance further includes:

calculating, by the calculation unit, a revolution illuminance percentage of an illuminance sensed by the light sensor when the light source revolves with respect to the light sensor for a second angle relative to an illuminance when the light sensor is at the first angle according to the following equation (8);

$$I_G = 24.338 + 89.349 \times \cos\theta_S \qquad \text{Equation (8)}$$

where $I_G$ is the revolution illuminance percentage, and $\theta_S$ is the second angle.

In an embodiment of the present invention, the light source is at a first angle relative to a normal line of the sensing face, the first color light is a blue light, and when the first angle is 0, the system for detecting an illuminance further includes a calculation unit coupled to the signal output module, the method for detecting an illuminance further includes:

calculating, by the calculation unit, a revolution illuminance percentage of an illuminance sensed by the light sensor when the light source revolves with respect to the light sensor for a second angle relative to an illuminance when the light sensor is at the first angle according to the following equation (9);

$$I_B = -1.44975 + 108.755 \times \cos\theta_S \qquad \text{Equation (9)}$$

where $I_B$ is the revolution illuminance percentage, and $\theta_S$ is the second angle.

DETAILED DESCRIPTION

Figure 1:
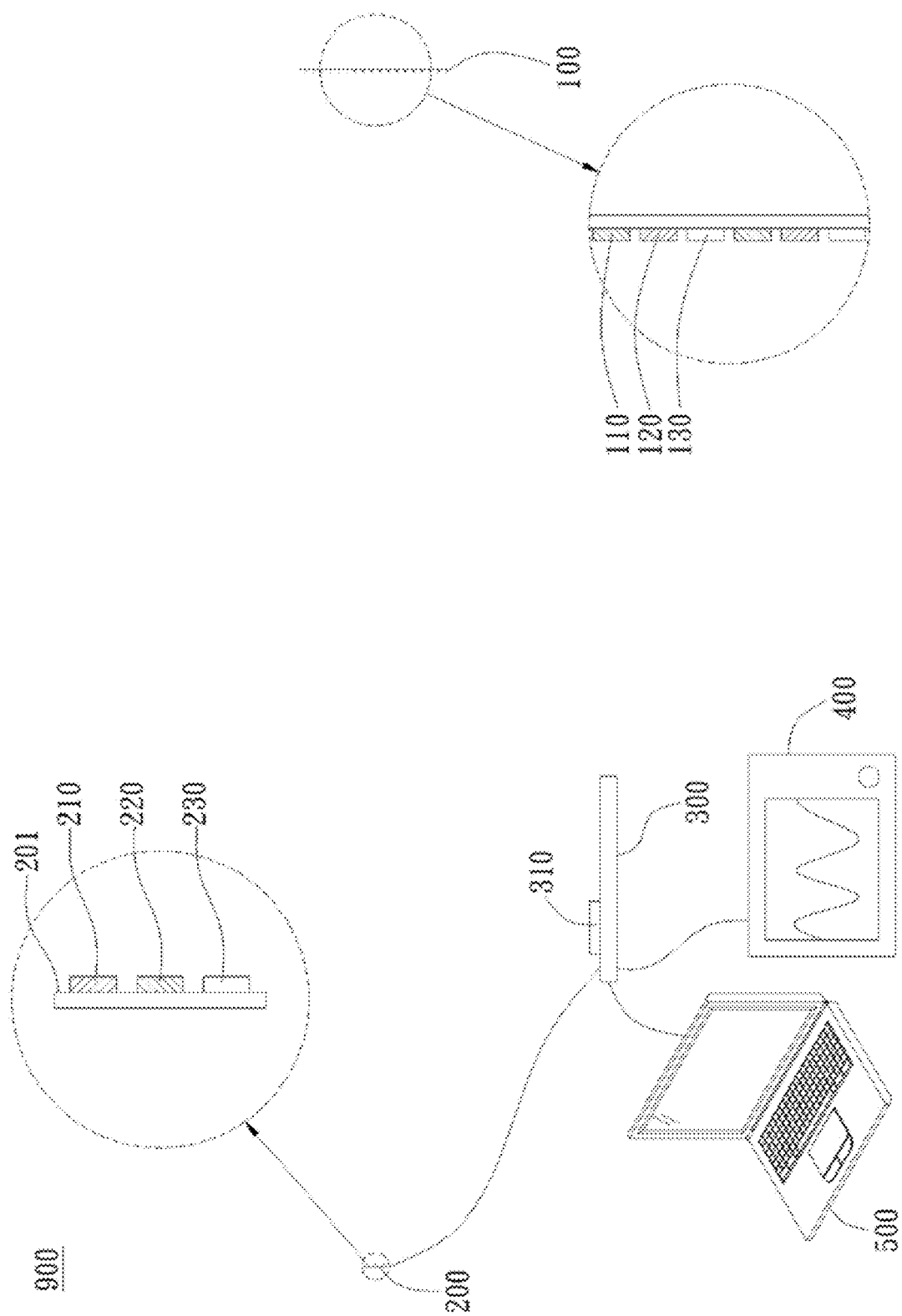
FIG. 1 is a schematic diagram of an embodiment of a system for detecting an illuminance according to the present invention.

In an embodiment shown in FIG. 1, a system 900 for detecting an illuminance of the present invention includes a light source 100, a light sensor 200, and a signal output module 300. The light source includes a first A light-emitting diode (LED) 110, the first A light-emitting diode 110 having a first color light; and the light source emits a ray of light. The light sensor 200 has a sensing face 201; the light sensor 200 includes a first B light-emitting diode 210 disposed on the sensing face 201, the first B light-emitting diode 210 having the first color light; and the light sensor 200 receives at least a portion of the first ray of light and generates a first sensing voltage. The signal output module 300 is coupled to the light sensor 200 to receive the first sensing voltage and output a sensing result signal according to the first sensing voltage. As an element for receiving light, the light-emitting diode may be referred to as a light receiving diode (LRD).

More particularly, the light-emitting diode generates a voltage due to a principle of reverse photoelectricity upon receiving a ray of light that has the same color as a ray of light that may be emitted by itself (i.e., radiated by light). Accordingly, since the first A light-emitting diode 110 and the first B light-emitting diode 210 have the same color light, upon receiving the first ray of light, the first B light-emitting diode 210 generates a first sensing voltage, and the signal output module 300 outputs a sensing result signal accordingly. In addition, since the light-emitting diode generates a voltage only when receiving a ray of light that has the same color as a ray of light that may be emitted by itself, it can be determined that the voltage is generated as a result of a ray of light that has the same color as the ray of light that may be emitted by the first B-emitting diode 210 itself. Viewed from different perspectives, the light sensor 200 has selectivity in the color of received rays of light. In conclusion, the present invention uses light-emitting diodes of relatively low costs as the light source and the light sensor, and uses the principle of reverse photoelectricity to generate a voltage for illumination sensing. This not only has economic benefits, but also may be used for illuminance detection for a specific color of a ray of light. In addition, compared with a combination of a wearing device and a large detection apparatus in the conventional technology, the light source, the sensor, and the signal output module included in the system for detecting an illuminance of the present invention have smaller sizes, and the sensor has a lower cost, is easier to abandon and replace, and is safe, hygienic and convenient to use.

As shown in FIG. 1, in an embodiment, the signal output module 300 includes an amplification unit 310, the amplification unit 310 amplifying the first sensing voltage to form the sensing result signal. The amplification unit 310 may be an element, such as a circuit, that functions to amplify a signal.

As shown in FIG. 1, in an embodiment, the system 900 for detecting an illuminance further includes a display device 400 coupled to the signal output module 300. The display device 400 displays a sensing result according to the sensing result signal. The display device 400 includes an oscilloscope or other devices that can display the sensing result signals as graphics, digits, etc.

As shown in FIG. 1, in an embodiment, the system 900 for detecting an illuminance further includes a calculation unit 500 coupled to the signal output module 300. The calculation unit 500 includes a central processing unit of a computer. In other words, the output module 300 may be coupled to the computer, and the central processing unit of the computer is used as a calculation unit to process the sensing result signal. In addition, a display of the computer may be further directly used as the display device to display a sensing result. In a different embodiment, the calculation unit and the coupled signal output module may be disposed on the same substrate or device.

More particularly, during operation of the system 900 for detecting an illuminance of the present invention, a measurement may be performed with a particular length and/or angle between the light source and the light sensor preset as a reference, and then a measurement is performed at another length and/or angle, to obtain a comparison of illuminances based on a ratio of two measurements. For example, in an embodiment, the light source and the light sensor are light-emitting diodes that emit a red light. When the light source is not turned on, a distance between the light source and the light sensor is 100 cm, and angle between the light source and the light sensor is 0, a sensing signal generated by the light sensor and output by the signal output module is a background voltage $V_{ref}$=−440.5 mV.

When the light source is turned on, a distance between the light source and the light sensor is 100 cm, and angle between the light source and the light sensor is 0, a sensing signal generated by the light sensor and output by the signal output module is a first sensing voltage $V_{100,ave}$=222.67 mV, and a measurement is: $V_{100}=V_{100,ave}-V_{ref}$=663.17 mV.

When the light source is turned on, a distance between the light source and the light sensor is 50 cm, and angle between the light source and the light sensor is 0, a sensing signal generated by the light sensor and output by the signal output module is a first sensing voltage $V_{50,ave}$=1954.67 mV, and a measurement is: $V_{50}=V_{50,ave}-V_{ref}$=2395.17 mV.

A ratio of the two measurements $R=V_{50}/V_{100}\times 100\%$=361%.

In other words, in the case that the light source and the light sensor are light-emitting diodes that emit a red light, if a measurement obtained when the light source is turned on, the distance between the light source and the light sensor is 100 cm, and the angle between the light source and the light sensor is 0 is used as a reference, when the distance between the light source and the light sensor is 50 cm, and the angle between the light source and the light sensor is 0, an illuminance is 361% of the reference.

Figure 2:
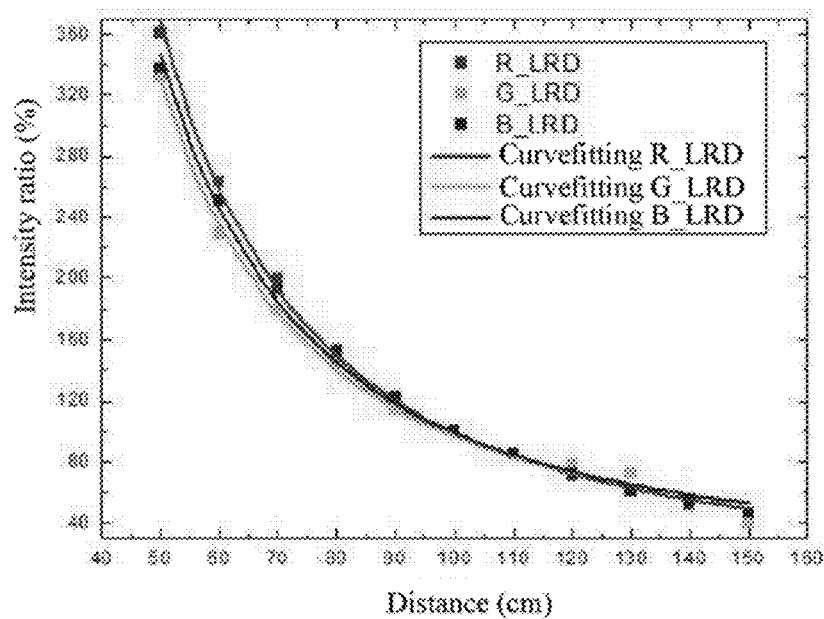
FIG. 2 is a diagram of a relationship between a light source irradiation distance and a light receiving intensity.

After multiple measurements, a diagram of a relationship between a light source irradiation distance and light receiving intensity may be obtained, as shown in FIG. 2, and the following equations (1), (2), and (3) may be obtained from the diagram. Further, in an embodiment of the present invention, the light source is at a first distance from the light sensor, the first color light is a red light (with a wavelength of 670 nm), and when the first distance is 100 cm, a distance illuminance percentage of an illuminance when the light sensor is at a second distance relative to an illuminance when the light sensor is at the first distance may be further calculated according to the following equation (1);

$$I_R = 9.271 + \frac{899186.745}{L^2} \qquad \text{Equation (1)}$$

where $I_R$ is the distance illuminance percentage, and L is the second distance. Taking L=50 (cm) as an example, $I_R$=368.947(%) may be calculated. In other words, when the distance is reduced from 100 cm to 50 cm, the received illuminance is increased by nearly 3.7 times.

More particularly, if a measurement obtained when the first color light is a red light, and the distance between the light source and the light sensor is 100 cm is a reference, an illuminance percentage of an illuminance when the light sensor is at the second distance relative to the reference may be quickly calculated by the above equation.

In an embodiment of the present invention, the light source is at a first distance from the light sensor, the first color light is a green light (with a wavelength of 528 nm), and when the first distance is 100 cm, the calculation unit further calculates a distance illuminance percentage of an illuminance when the light sensor is at a second distance relative to an illuminance when the light sensor is at the first distance according to the following equation (2);

$$I_G = 18.291 + \frac{781952.998}{L^2} \qquad \text{Equation (2)}$$

where $I_G$ is the distance illuminance percentage, and L is the second distance.

In an embodiment of the present invention, the light source is at a first distance from the light sensor, the first color light is a blue light (with a wavelength of 485 nm), and when the first distance is 100 cm, the calculation unit further calculates a distance illuminance percentage of an illuminance when the light sensor is at a second distance relative to an illuminance when the light sensor is at the first distance according to the following equation (3);

$$I_B = 15.739 + \frac{828976.281}{L^2} \qquad \text{Equation (3)}$$

where $I_B$ is the distance illuminance percentage, and L is the second distance.

Figure 3:
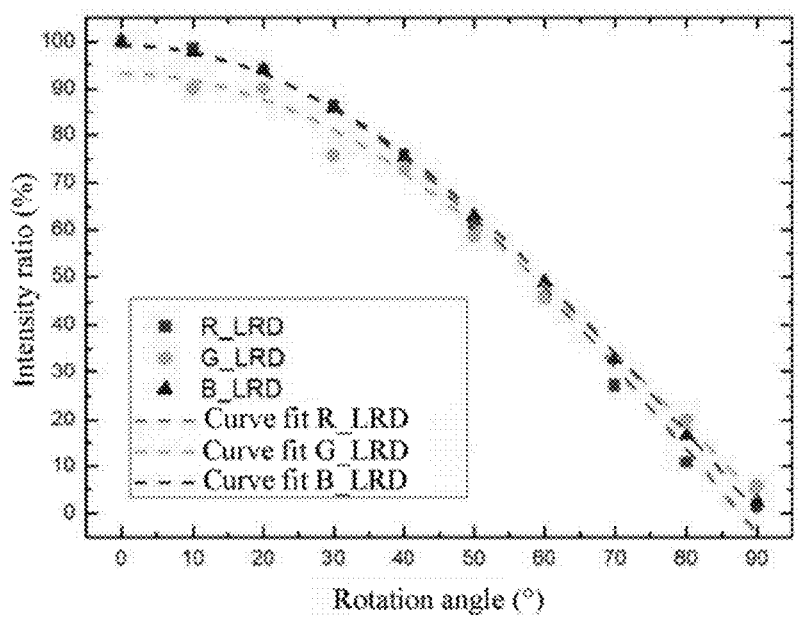
FIG. 3 is a diagram of a relationship between a receiving light source angle (rotation) and a light receiving intensity.

After multiple measurements, a diagram between of a relationship between a receiving light source angle (rotation) and a light receiving intensity may be obtained, as shown in FIG. 3, and the following equations (4), (5), and (6) may be obtained from the diagram. In an embodiment of the present invention, the light source is at a first angle relative to a normal line of the sensing face, the first color light is a red light, and when the first angle is 0, the calculation unit further calculates a rotation illuminance percentage of an illuminance when the light sensor rotates (that is, the light source is stationary, and the light sensor rotates in situ) with respect to the light source for a second angle relative to an illuminance when the light sensor is at the first angle according to the following equation (4);

$$I_R = -4.34778 + 103.828 \times \cos\theta_R \qquad \text{Equation (4)}$$

where $I_R$ is the rotation illuminance percentage, and $\theta_R$ is the second angle.

In an embodiment of the present invention, the light source is at a first angle relative to a normal line of the sensing face, the first color light is a green light, and when the first angle is 0, the calculation unit further calculates a rotation illuminance percentage of an illuminance when the light sensor rotates with respect to the light source for a second angle relative to an illuminance when the light sensor is at the first angle according to the following equation (5);

$$I_G = 3.27932 + 89.885 \times \cos\theta_R \qquad \text{Equation (5)}$$

where $I_G$ is the rotation illuminance percentage, and $\theta_R$ is the second angle. Taking $\theta_R = 50°$ as an example, $I_G = 61.056$ (%) may be calculated. In other words, when the light sensor rotates from 0° to 50° relative to the light source, the received illuminance is reduced by nearly 0.61 times.

In an embodiment of the present invention, the light source is at a first angle relative to a normal line of the sensing face, the first color light is a blue light, and when the first angle is 0, the calculation unit further calculates a rotation illuminance percentage of an illuminance when the light sensor rotates with respect to the light source for a second angle relative to an illuminance when the light sensor is at the first angle according to the following equation (6);

$$I_B = 0.15324 + 99.018 \times \cos\theta_R \qquad \text{Equation (6)}$$

where $I_B$ is the rotation illuminance percentage, and $\theta_R$ is the second angle.

Figure 4:
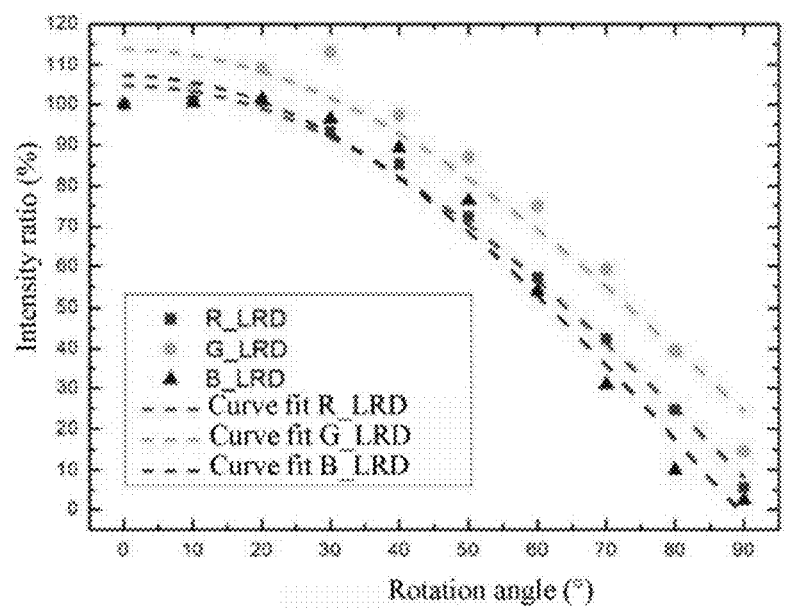
FIG. 4 is a diagram of a relationship between a receiving light source angle (revolution) and a light receiving intensity.

After multiple measurements, a diagram between of a relationship between a receiving light source angle (revolution) and a light receiving intensity may be obtained, as shown in FIG. 4, and the following equations (7), (8), and (9) may be obtained from the diagram. In an embodiment of the present invention, the light source is at a first angle relative to a normal line of the sensing face, the first color light is a red light, and when the first angle is 0, the calculation unit further calculates a revolution illuminance percentage of an illuminance sensed by the light sensor when the light source revolves (that is, the light sensor is stationary, and the light sensor rotates around the light sensor) with respect to the light sensor for a second angle relative to an illuminance when the light sensor is at the first angle according to the following equation (7);

$$I_R = 8.136 + 96.722 \times \cos\theta_S \qquad \text{Equation (7)}$$

where $I_R$ is the revolution illuminance percentage, and $\theta_S$ is the second angle.

In an embodiment of the present invention, the light source is at a first angle relative to a normal line of the sensing face, the first color light is a green light, and when the first angle is 0, the calculation unit further calculates a revolution illuminance percentage of an illuminance sensed by the light sensor when the light source revolves with respect to the light sensor for a second angle relative to an illuminance when the light sensor is at the first angle according to the following equation (8);

$$I_G = 24.338 + 89.349 \times \cos\theta_S \qquad \text{Equation (8)}$$

where $I_G$ is the revolution illuminance percentage, and $\theta_S$ is the second angle.

In an embodiment of the present invention, the light source is at a first angle relative to a normal line of the sensing face, the first color light is a blue light, and when the first angle is 0, the calculation unit further calculates a revolution illuminance percentage of an illuminance sensed by the light sensor when the light source revolves with respect to the light sensor for a second angle relative to an illuminance when the light sensor is at the first angle according to the following equation (9);

$$I_B = -1.44975 + 108.755 \times \cos\theta_S \qquad \text{Equation (9)}$$

where $I_B$ is the revolution illuminance percentage, and $\theta_S$ is the second angle. Taking $\theta_S = 50°$ as an example, $I_G = 68.457(\%)$ may be calculated. In other words, when the light source revolves to 50° relative to the light sensor, the received illuminance is reduced by nearly 0.68 times.

Calculations of the above equations (1)-(9) may be performed by the calculation unit.

In an embodiment shown in FIG. 1, the light source 100 may further include a second A light-emitting diode 120 and a third A light-emitting diode 130. The second A light-emitting diode 120 has a second color light, and the third A light-emitting diode 130 has a third color light. The light sensor 200 may further include a second B light-emitting diode 220 and a third B light-emitting diode 230. The second B light-emitting diode 220 is disposed on the sensing face 201, and the second B light-emitting diode 220 has the second color light. The third B light-emitting diode 230 is disposed on the sensing face 201, and the third B light-emitting diode 230 has the third color light. Further, to meet requirements of use, design or manufacture, a plurality of light-emitting diodes having different color lights may be disposed in the light source 100, and light-emitting diodes having such color lights may be correspondingly disposed in the light sensor 200 for sensing.

Figure 5:
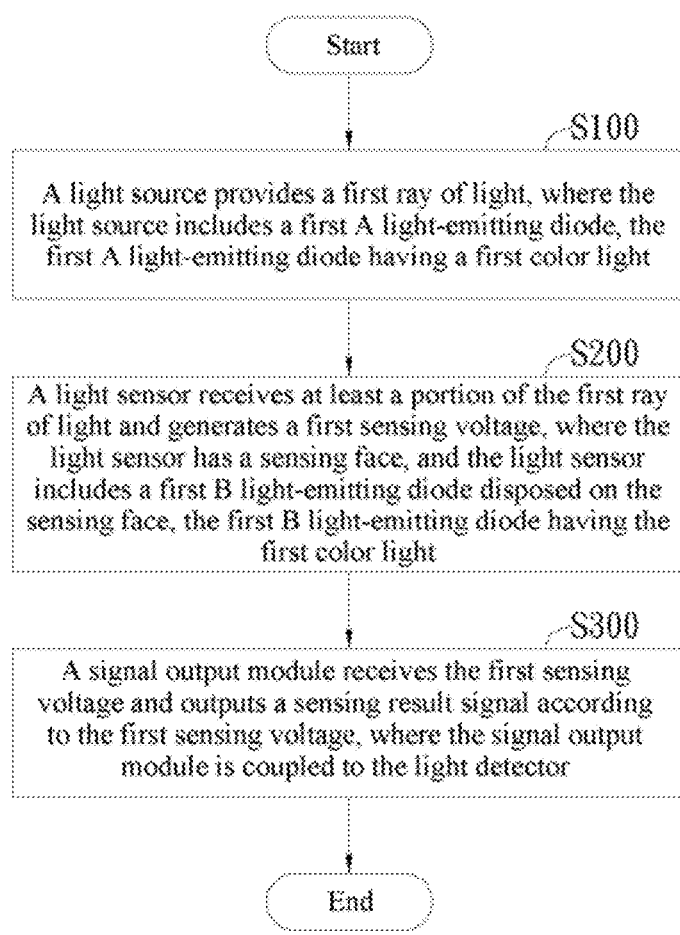
FIG. 5 is a schematic flowchart of an embodiment of a method for detecting an illuminance according to the present invention.

In an embodiment shown in FIG. 5, a method for detecting an illuminance of the present invention includes the following steps.

Step S100: A light source provides a first ray of light, where the light source includes a first A light-emitting diode (LED), the first A light-emitting diode having a first color light.

Step S200: A light sensor receives at least a portion of the first ray of light and generates a first sensing voltage, where the light sensor has a sensing face; and the light sensor includes a first B light-emitting diode disposed on the sensing face, the first B light-emitting diode having the first color light.

Step S300: A signal output module receives the first sensing voltage and outputs a sensing result signal according to the first sensing voltage, where the signal output module is coupled to the light sensor.

In an embodiment of the present invention, the light source is at a first distance from the light sensor, the first color light is a red light, and when the first distance is 100 cm, the system for detecting an illuminance further includes a calculation unit coupled to the signal output module, the method for detecting an illuminance further includes:

calculating, by the calculation unit, a distance illuminance percentage of an illuminance when the light sensor is at a second distance relative to an illuminance when the light sensor is at the first distance according to the following equation (1);

$$I_R = 9.271 + \frac{899186.745}{L^2} \quad \text{Equation (1)}$$

where $I_R$ is the distance illuminance percentage, and L is the second distance.

In an embodiment of the present invention, the light source is at a first distance from the light sensor, the first color light is a green light, and when the first distance is 100 cm, the system for detecting an illuminance further includes a calculation unit coupled to the signal output module, the method for detecting an illuminance further includes:

calculating, by the calculation unit, a percentage of an illuminance when the light sensor is at a second distance relative to an illuminance when the light sensor is at the first distance according to the following equation (2);

$$I_G = 18.291 + \frac{781952.998}{L^2} \quad \text{Equation (2)}$$

where $I_G$ is the distance illuminance percentage, and L is the second distance.

In an embodiment of the present invention, the light source is at a first distance from the light sensor, the first color light is a blue light, and when the first distance is 100 cm, the system for detecting an illuminance further includes a calculation unit coupled to the signal output module, the method for detecting an illuminance further includes:

calculating, by the calculation unit, a percentage of an illuminance when the light sensor is at a second distance relative to an illuminance when the light sensor is at the first distance according to the following equation (3);

$$I_B = 15.739 + \frac{828976.281}{L^2} \quad \text{Equation (3)}$$

where $I_B$ is the distance illuminance percentage, and L is the second distance.

In an embodiment of the present invention, the light source is at a first angle relative to a normal line of the sensing face, the first color light is a red light, and when the first angle is 0, the system for detecting an illuminance further includes a calculation unit coupled to the signal output module, the method for detecting an illuminance further includes:

calculating, by the calculation unit, a rotation illuminance percentage of an illuminance when the light sensor rotates with respect to the light source for a second angle relative to an illuminance when the light sensor is at the first angle according to the following equation (4);

$$I_R = -4.34778 + 103.828 \times \cos \theta_R \quad \text{Equation (4)}$$

where $I_R$ is the rotation illuminance percentage, and $\theta_R$ is the second angle.

In an embodiment of the present invention, the light source is at a first angle relative to a normal line of the sensing face, the first color light is a green light, and when the first angle is 0, the system for detecting an illuminance further includes a calculation unit coupled to the signal output module, the method for detecting an illuminance further includes:

calculating, by the calculation unit, a rotation illuminance percentage of an illuminance when the light sensor rotates with respect to the light source for a second angle relative to an illuminance when the light sensor is at the first angle according to the following equation (5);

$$I_G = 3.27932 + 89.885 \times \cos \theta_R \quad \text{Equation (5)}$$

where $I_G$ is the rotation illuminance percentage, and $\theta_R$ is the second angle.

In an embodiment of the present invention, the light source is at a first angle relative to a normal line of the sensing face, the first color light is a blue light, and when the first angle is 0, the system for detecting an illuminance further includes a calculation unit coupled to the signal output module, the method for detecting an illuminance further includes:

calculating, by the calculation unit, a rotation illuminance percentage of an illuminance when the light sensor rotates with respect to the light source for a second angle relative to an illuminance when the light sensor is at the first angle according to the following equation (6);

$$I_B = 0.15324 + 99.018 \times \cos \theta_R \quad \text{Equation (6)}$$

where $I_B$ is the rotation illuminance percentage, and $\theta_R$ is the second angle.

In an embodiment of the present invention, the light source is at a first angle relative to a normal line of the sensing face, the first color light is a red light, and when the first angle is 0, the system for detecting an illuminance further includes a calculation unit coupled to the signal output module, the method for detecting an illuminance further includes:

calculating, by the calculation unit, a revolution illuminance percentage of an illuminance sensed by the light sensor when the light source revolves with respect to the light sensor for a second angle relative to an illuminance when the light sensor is at the first angle according to the following equation (7);

$$I_R = 8.136 + 96.722 \times \cos \theta_S \quad \text{Equation (7)}$$

where $I_R$ is the revolution illuminance percentage, and $\theta_S$ is the second angle.

In an embodiment of the present invention, the light source is at a first angle relative to a normal line of the sensing face, the first color light is a green light, and when the first angle is 0, the system for detecting an illuminance further includes a calculation unit coupled to the signal output module, the method for detecting an illuminance further includes:

calculating, by the calculation unit, a revolution illuminance percentage of an illuminance sensed by the light sensor when the light source revolves with respect to the light sensor for a second angle relative to an illuminance when the light sensor is at the first angle according to the following equation (8);

$$I_G = 24.338 + 89.349 \times \cos \theta_S \quad \text{Equation (8)}$$

where $I_G$ is the revolution illuminance percentage, and $\theta_S$ is the second angle.

In an embodiment of the present invention, the light source is at a first angle relative to a normal line of the sensing face, the first color light is a blue light, and when the first angle is 0, the system for detecting an illuminance further includes a calculation unit coupled to the signal output module, the method for detecting an illuminance further includes:

calculating, by the calculation unit, a revolution illuminance percentage of an illuminance sensed by the light sensor when the light source revolves with respect to the light sensor for a second angle relative to an illuminance when the light sensor is at the first angle according to the following equation (9);

$$I_B = -1.44975 + 108.755 \times \cos \theta_S \quad \text{Equation (9)}$$

where $I_B$ is the revolution illuminance percentage, and $\theta_S$ is the second angle.

Figure 6:
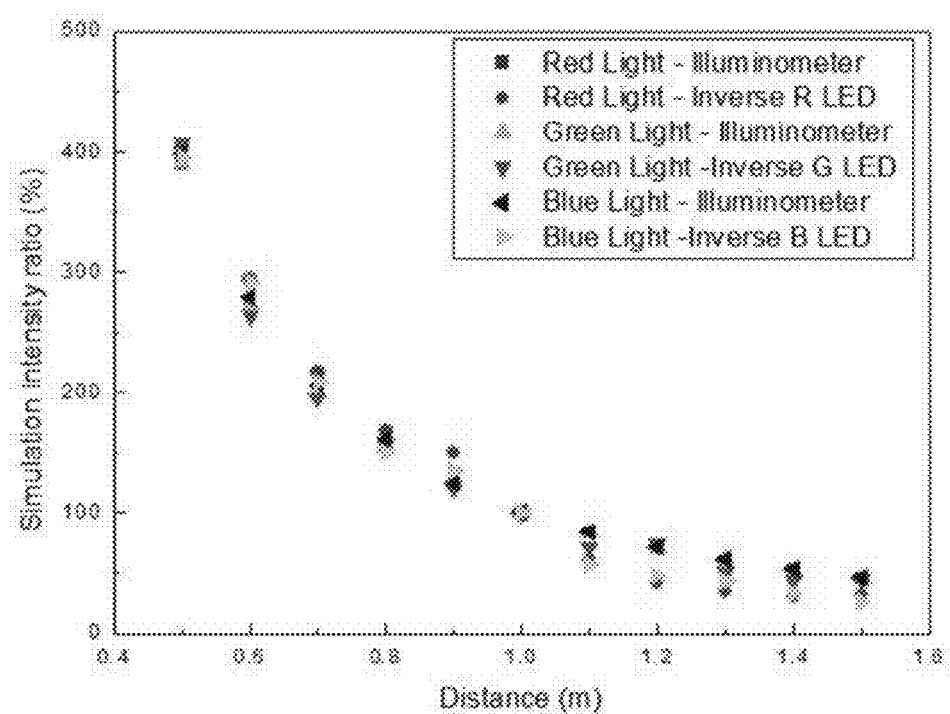
FIGS. 6-16 are diagrams showing results of tests that performed on the system for detecting an illuminance of the present invention.
Figure 7:
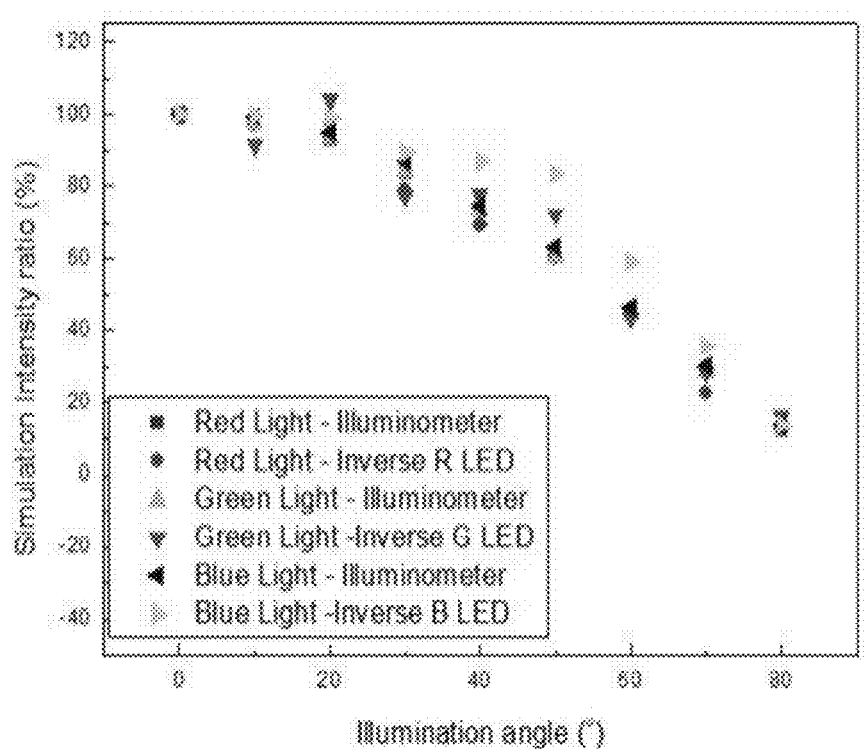

Further, a test was performed on the system for detecting an illuminance of the present invention as follows. In the embodiments as shown in FIG. 6 and FIG. 7, optical simulation software (FRED, Photon Engineering, LLC, USA) was employed to simulate measurements of the system for detecting an illuminance of the present invention (Inverse) when radiated by three types of light sources, i.e., a red-light LED, a green-light LED, and blue-light LED, and the measurements were compared to measurements from a commercially available illuminometer (TM201, TENMARS, TAIWAN). FIG. 6 and FIG. 7 illustrate measurements obtained at different distances and at different angles relative to the light sources, respectively. As shown in FIG. 6 and FIG. 7, the simulation measurements of the system for detecting an illuminance of the present invention are close to the actual measurements from the commercially available illuminometer.

Figure 8:
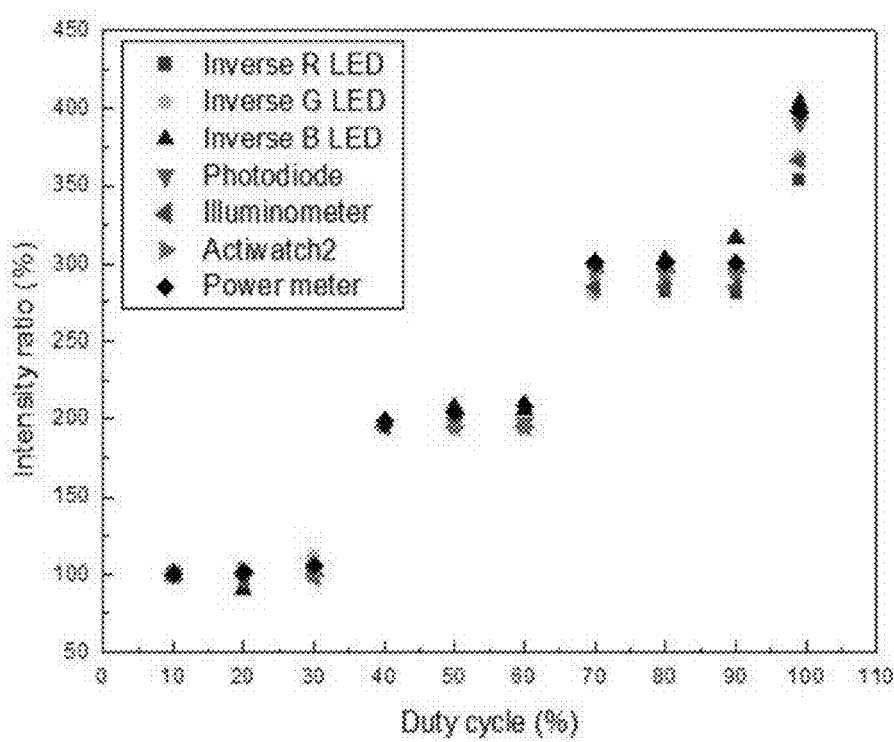

In an embodiment as shown in FIG. 8, a measurement was performed on the system for detecting an illuminance of the present invention and commercially available light sensors at different duty cycles for illumination systems. "Inverse" represents the system for detecting an illuminance of the present invention; "Photodiode" represents a commercially available diode sensor (720-SFH2701, MOUSER Electronics, USA); "Illuminometer" represents a commercially available illuminometer (TM201, TENMARS, TAIWAN); "Actiwatch2" represents a sensing device of a third type for detecting light intensities as approved by the Food and Drug Administration (FDA) (PHILIPS Actiwatch 2, PHILIPS, Netherlands); and "Power meter" represents a power meter (PM200, THORLABS, USA). As shown in FIG. 8, measurements of the system for detecting an illuminance of the present invention are close to actual measurements from the commercially available products.

Figure 9:
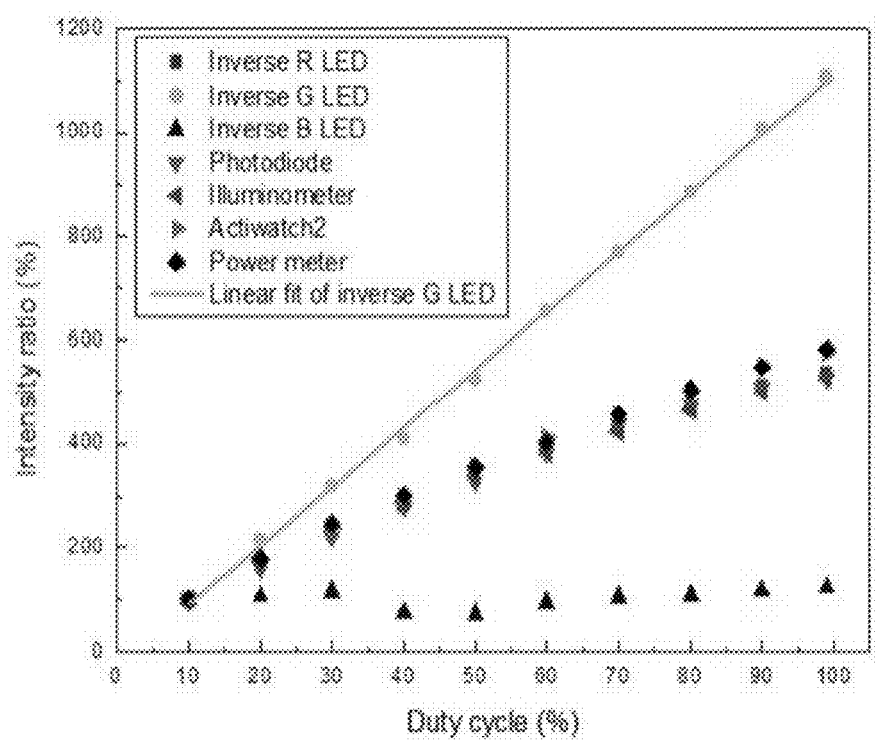
Figure 10:
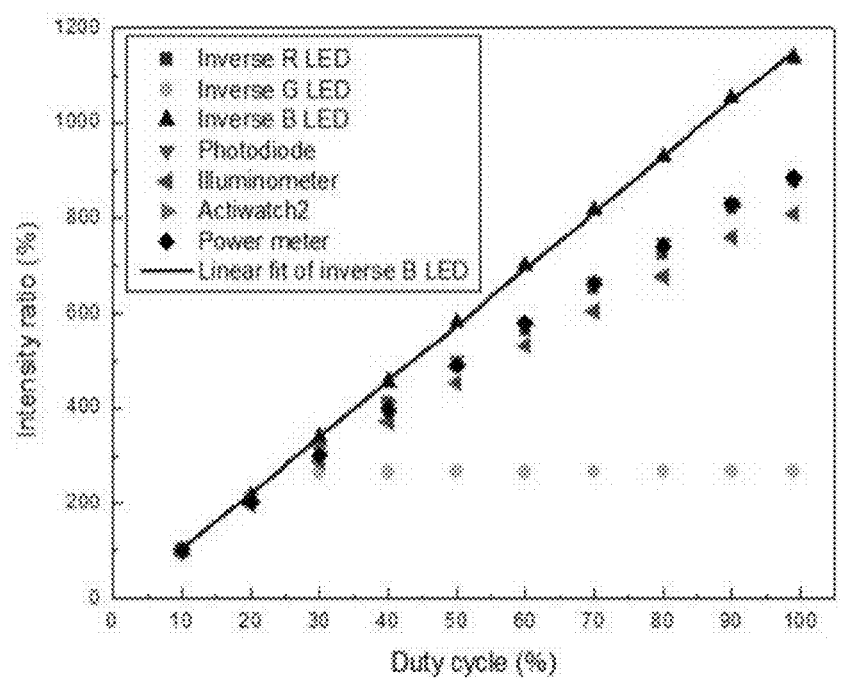
Figure 11:
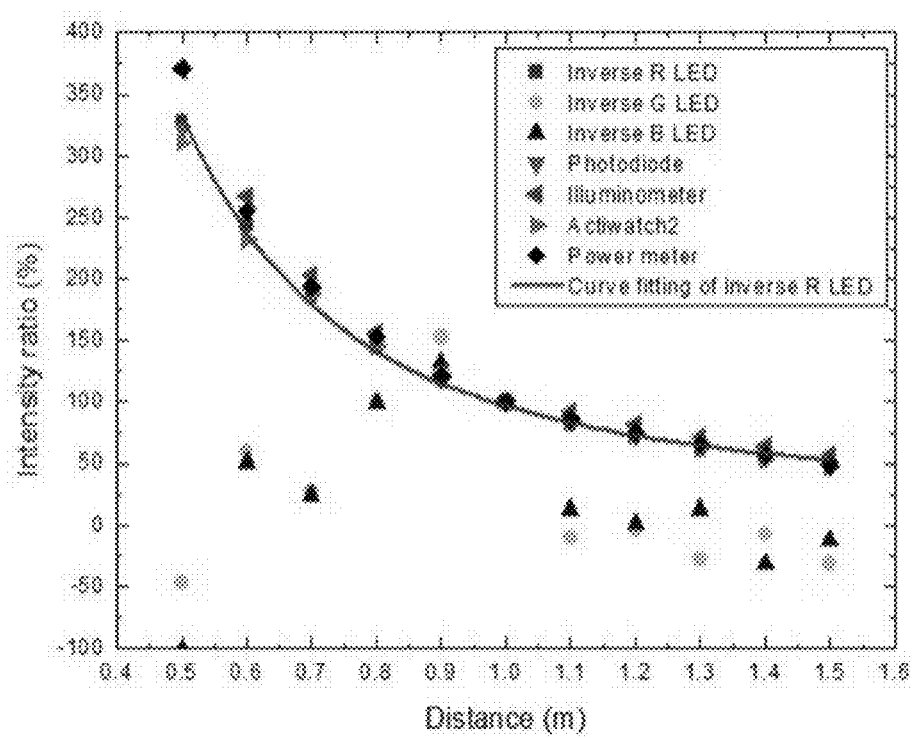
Figure 12:
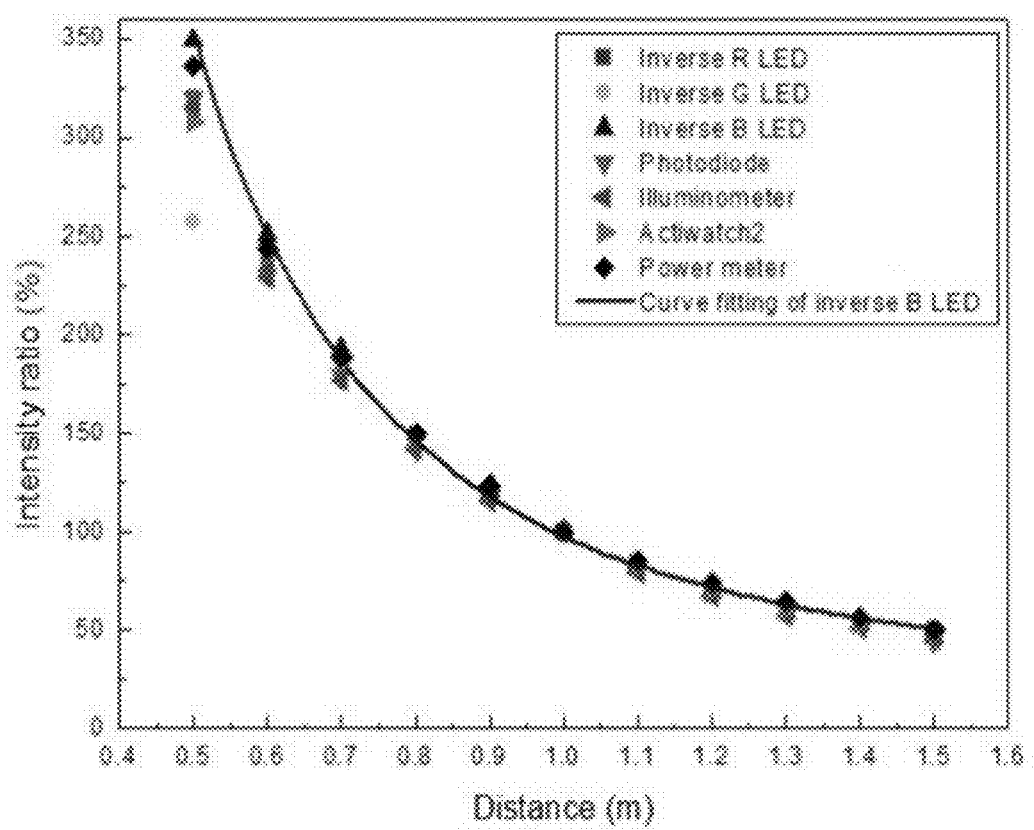
Figure 13:
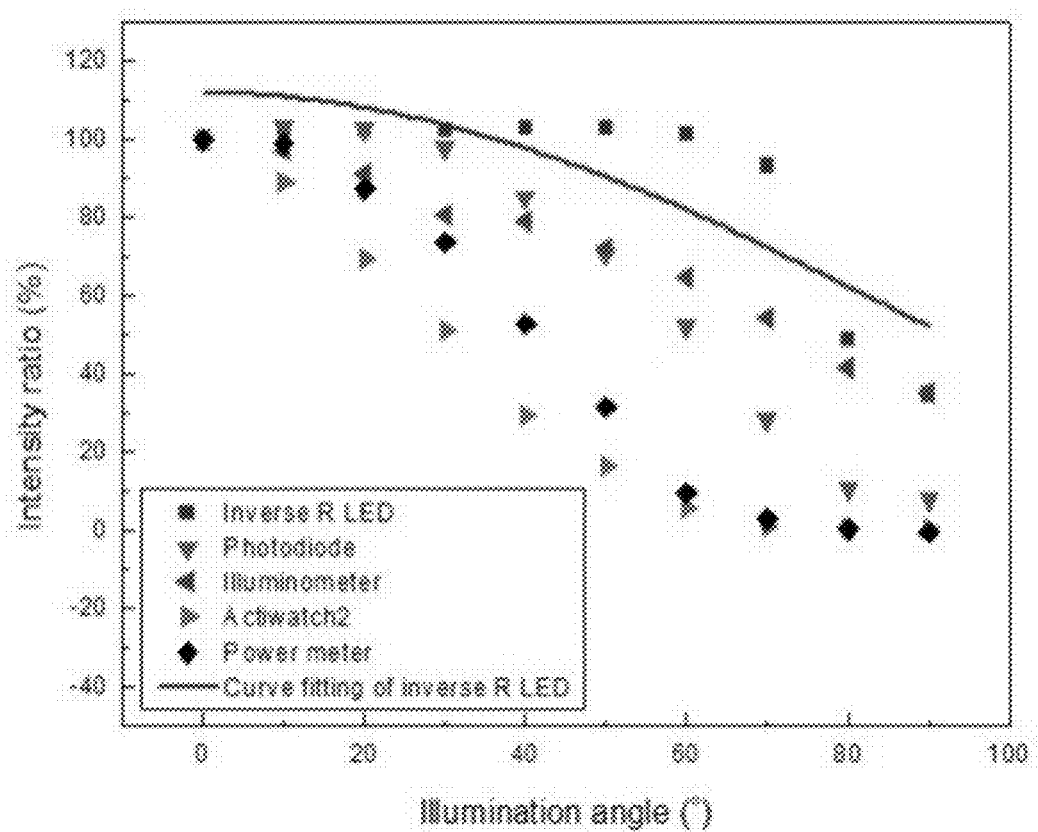
Figure 14:
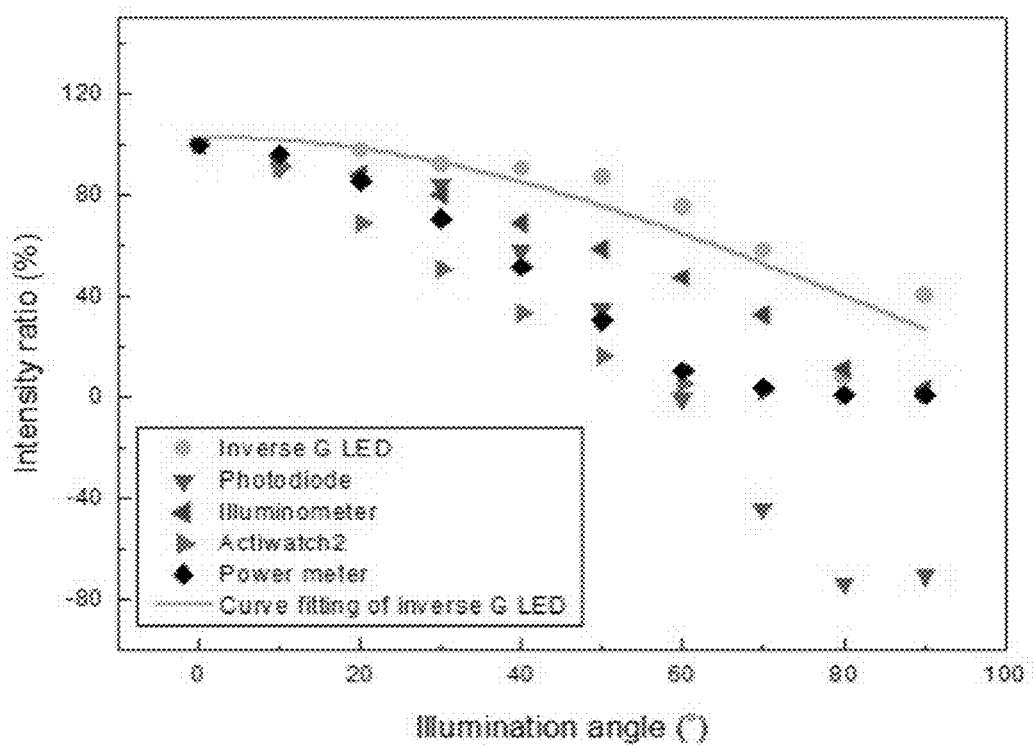
Figure 15:
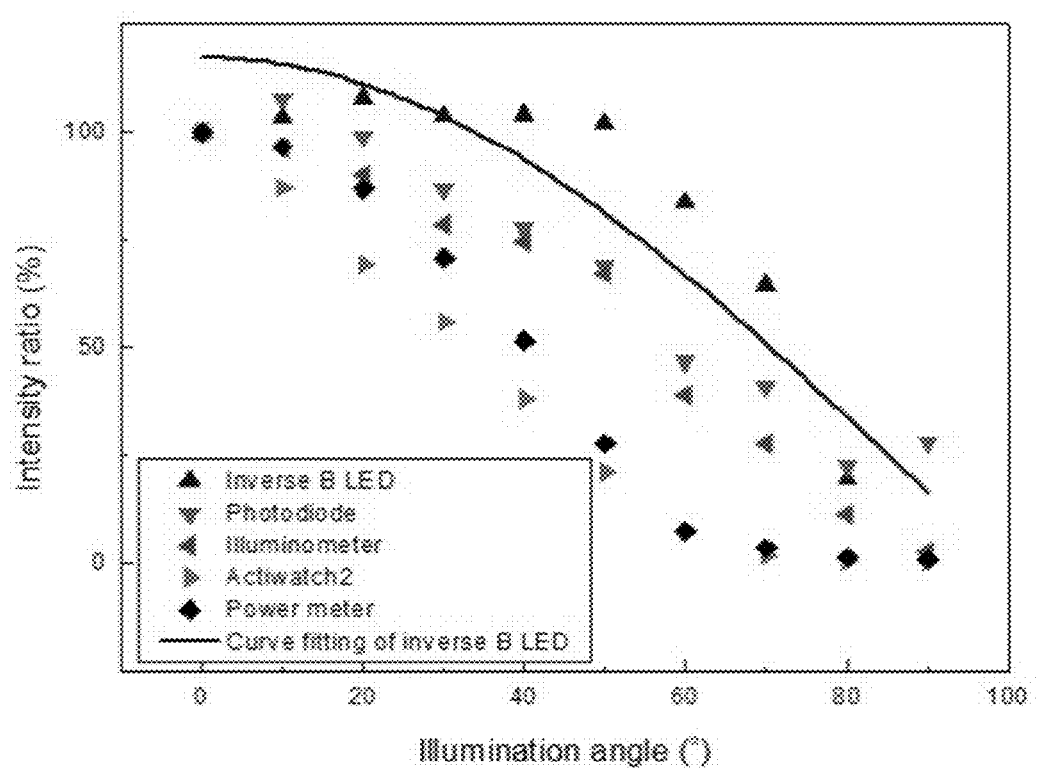
Figure 16:
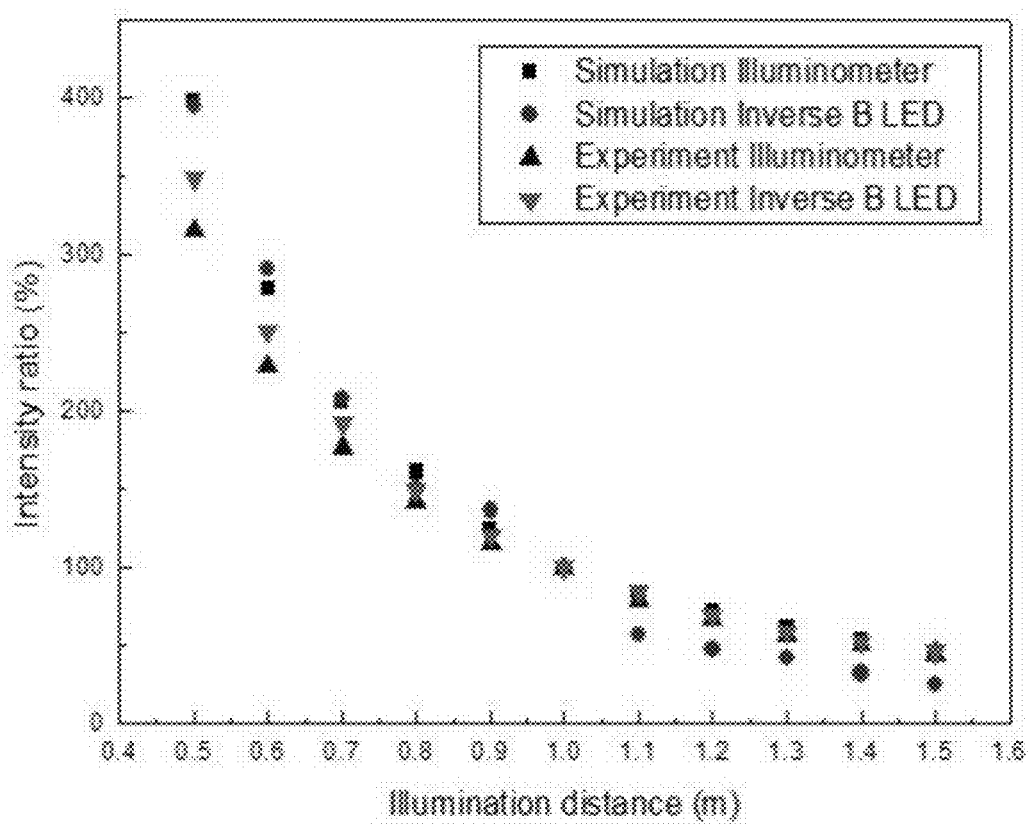

In the embodiments as shown in FIG. 9 and FIG. 10, a measurement was performed on the system for detecting an illuminance of the present invention and commercially available light sensors at different duty cycles for illumination systems with only a green light and a blue light being provided. In the embodiments as shown in FIG. 11 and FIG. 12, a measurement was performed on the system for detecting an illuminance of the present invention and commercially available light sensors at different measurement distances with only a red light and a blue light being provided. In the embodiments as shown in FIG. 13, FIG. 14, and FIG. 15, a measurement was performed on the system for detecting an illuminance of the present invention and commercially available light sensors at different angles with only a red light, a green light, and a blue light being provided, a light source being positioned at a distance of 1 m from the light receivers, and the light source being rotated. As shown in the embodiments above, in the case that only a green light, a blue light, and a red light are provided, only a green-light LED, a blue-light LED, and a red-light LED of the system for detecting an illuminance of the present invention respond respectively, and measurements obtained therefrom have the same trend as actual measurements from the commercially available products. As a result, it can be determined that the system for detecting an illuminance of the present invention can select a color of a ray of light it receives. On the other hand, in an embodiment as shown in FIG. 16, the optical simulation software (FRED, Photon Engineering, LLC, USA) was employed to simulate measurements of the system for detecting an illuminance of the present invention (Inverse) when radiated by a blue-light source, and the measurements were compared with actual measurements. As shown in FIG. 16, the simulation measurements of the system for detecting an illuminance of the present invention are close to the actual measurements.

While the foregoing description and drawings have disclosed preferred embodiments of the present invention, it should be understood that various additions, modifications, and substitutions may be made to the preferred embodiment of the invention without departing from the spirit and scope of the principles of the invention as defined by the appended claims. Persons of ordinary skill in the art who are familiar with the technical field of the present invention will appreciate that many modifications may be made to forms, configurations, arrangements, ratios, materials, elements, and components of the present invention. Therefore, the embodiments disclosed herein are to be considered as illustrative but not restrictive. The scope of the present invention is defined by the appended claims, and covers its legal equivalents and is not limited to the previous description.

DESCRIPTION OF REFERENCE SIGNS

100 Light source
110 First A light-emitting diode
120 Second A light-emitting diode
130 Third A light-emitting diode
200 Light sensor
201 Sensing face
210 First B light-emitting diode
220 Second B light-emitting diode
230 Third B light-emitting diode
300 Signal output module
310 Amplification unit
400 Display device 500 Calculation unit
900 System for detecting illuminance
S100 Step
S200 Step
S300 Step

What is claimed is:

1. A system for detecting an illuminance, comprising:
    a light source comprising a first A light-emitting diode (LED), the first A light-emitting diode having a first color light, the light source emitting a first ray of light;
    a light sensor having a sensing face, the light sensor comprising a first B light-emitting diode disposed on the sensing face, the first B light-emitting diode having the first color light, the light sensor receiving at least a portion of the first ray of light and generating a first sensing voltage; and
    a signal output module coupled to the light sensor to receive the first sensing voltage and output a sensing result signal according to the first sensing voltage.

2. The system for detecting an illuminance according to claim 1, wherein the signal output module comprises an amplification unit, the amplification unit amplifying the first sensing voltage to form the sensing result signal.

3. The system for detecting an illuminance according to claim 1, further comprising a display device coupled to the signal output module, the display device displaying a sensing result according to the sensing result signal.

4. The system for detecting an illuminance according to claim 1, further comprising a calculation unit coupled to the signal output module.

5. The system for detecting an illuminance according to claim 4, wherein the light source is at a first distance from the light sensor, the first color light is a red light, and when the first distance is 100 cm, the calculation unit further calculates a distance illuminance percentage of an illuminance when the light sensor is at a second distance relative to an illuminance when the light sensor is at the first distance according to the following equation (1);

$$I_R = 9.271 + \frac{899186.745}{L^2} \qquad \text{Equation (1)}$$

wherein $I_R$ is the distance illuminance percentage, and L is the second distance.

6. The system for detecting an illuminance according to claim 4, wherein the light source is at a first distance from the light sensor, the first color light is a green light, and when the first distance is 100 cm, the calculation unit further calculates a distance illuminance percentage of an illuminance when the light sensor is at a second distance relative to an illuminance when the light sensor is at the first distance according to the following equation (2);

$$I_G = 18.291 + \frac{781952.998}{L^2} \qquad \text{Equation (2)}$$

wherein $I_G$ is the distance illuminance percentage, and L is the second distance.

7. The system for detecting an illuminance according to claim 4, wherein the light source is at a first distance from the light sensor, the first color light is a blue light, and when the first distance is 100 cm, the calculation unit further calculates a distance illuminance percentage of an illuminance when the light sensor is at a second distance relative to an illuminance when the light sensor is at the first distance according to the following equation (3);

$$I_B = 15.739 + \frac{828976.281}{L^2} \qquad \text{Equation (3)}$$

wherein $I_B$ is the distance illuminance percentage, and L is the second distance.

8. The system for detecting an illuminance according to claim 4, wherein the light source is at a first angle relative to a normal line of the sensing face, the first color light is a red light, and when the first angle is 0, the calculation unit further calculates a rotation illuminance percentage of an illuminance when the light sensor rotates with respect to the light source for a second angle relative to an illuminance when the light sensor is at the first angle according to the following equation (4);

$$I_R = -4.34778 + 103.828 \times \cos\theta_R \qquad \text{Equation (4)}$$

wherein $I_R$ is the rotation illuminance percentage, and $\theta_R$ is the second angle.

9. The system for detecting an illuminance according to claim 4, wherein the light source is at a first angle relative to a normal line of the sensing face, the first color light is a green light, and when the first angle is 0, the calculation unit further calculates a rotation illuminance percentage of an illuminance when the light sensor rotates with respect to the light source for a second angle relative to an illuminance when the light sensor is at the first angle according to the following equation (5);

$$I_G = 3.27932 + 89.885 \times \cos\theta_R \qquad \text{Equation (5)}$$

wherein $I_G$ is the rotation illuminance percentage, and $\theta_R$ is the second angle.

10. The system for detecting an illuminance according to claim 4, wherein the light source is at a first angle relative to a normal line of the sensing face, the first color light is a blue light, and when the first angle is 0, the calculation unit further calculates a rotation illuminance percentage of an illuminance when the light sensor rotates with respect to the light source for a second angle relative to an illuminance when the light sensor is at the first angle according to the following equation (6);

$$I_B = 0.15324 + 99.018 \times \cos\theta_R \qquad \text{Equation (6)}$$

wherein $I_B$ is the rotation illuminance percentage, and $\theta_R$ is the second angle.

11. The system for detecting an illuminance according to claim 4, wherein the light source is at a first angle relative to a normal line of the sensing face, the first color light is a red light, and when the first angle is 0, the calculation unit further calculates a revolution illuminance percentage of an illuminance sensed by the light sensor when the light source revolves with respect to the light sensor for a second angle relative to an illuminance when the light sensor is at the first angle according to the following equation (7);

$$I_R = 8.136 + 96.722 \times \cos\theta_S \qquad \text{Equation (7)}$$

wherein $I_R$ is the revolution illuminance percentage, and $\theta_S$ is the second angle.

12. The system for detecting an illuminance according to claim 4, wherein the light source is at a first angle relative to a normal line of the sensing face, the first color light is a green light, and when the first angle is 0, the calculation unit further calculates a revolution illuminance percentage of an illuminance sensed by the light sensor when the light source revolves with respect to the light sensor for a second angle relative to an illuminance when the light sensor is at the first angle according to the following equation (8);

$$I_G = 24.338 + 89.349 \times \cos \theta_S \quad \text{Equation (8)}$$

wherein $I_G$ is the revolution illuminance percentage, and $\theta_S$ is the second angle.

13. The system for detecting an illuminance according to claim 4, wherein the light source is at a first angle relative to a normal line of the sensing face, the first color light is a blue light, and when the first angle is 0, the calculation unit further calculates a revolution illuminance percentage of an illuminance sensed by the light sensor when the light source revolves with respect to the light sensor for a second angle relative to an illuminance when the light sensor is at the first angle according to the following equation (9);

$$I_B = -1.44975 + 108.755 \times \cos \theta_S \quad \text{Equation (9)}$$

wherein $I_B$ is the revolution illuminance percentage, and $\theta_S$ is the second angle.

14. The system for detecting an illuminance according to claim 1, wherein:
the light source further comprises:
a second A light-emitting diode, the second A light-emitting diode having a second color light;
a third A light-emitting diode, the third A light-emitting diode having a third color light;
the light sensor further comprises:
a second B light-emitting diode disposed on the sensing face, the second B light-emitting diode having the second color light;
a third B light-emitting diode disposed on the sensing face, the third B light-emitting diode having the third color light.

15. A method for detecting an illuminance, comprising:
providing, by a light source, a first ray of light, wherein the light source comprises a first A light-emitting diode (LED), the first A light-emitting diode having a first color light;
receiving, by a light sensor, at least a portion of the first ray of light and generating a first sensing voltage, wherein the light sensor has a sensing face, and the light sensor comprises a first B light-emitting diode disposed on the sensing face, the first B light-emitting diode having the first color light; and
receiving, by a signal output module, the first sensing voltage and outputting a sensing result signal according to the first sensing voltage, wherein the signal output module is coupled to the light sensor.

16. The method for detecting an illuminance according to claim 15, wherein the light source is at a first distance from the light sensor, the first color light is a red light, and when the first distance is 100 cm, the system for detecting an illuminance further comprises a calculation unit is coupled to the signal output module, the method for detecting an illuminance further comprises:
calculating, by the calculation unit, a distance illuminance percentage of an illuminance when the light sensor is at a second distance relative to an illuminance when the light sensor is at the first distance according to the following equation (1);

$$I_R = 9.271 + \frac{899186.745}{L^2} \quad \text{Equation (1)}$$

wherein $I_R$ is the distance illuminance percentage, and $L$ is the second distance.

17. The method for detecting an illuminance according to claim 15, wherein the light source is at a first distance from the light sensor, the first color light is a green light, and when the first distance is 100 cm, the system for detecting an illuminance further comprises a calculation unit is coupled to the signal output module, the method for detecting an illuminance further comprises:
calculating, by the calculation unit, a percentage of an illuminance when the light sensor is at a second distance relative to an illuminance when the light sensor is at the first distance according to the following equation (2);

$$I_G = 18.291 + \frac{781952.998}{L^2} \quad \text{Equation (2)}$$

wherein $I_G$ is the distance illuminance percentage, and $L$ is the second distance.

18. The method for detecting an illuminance according to claim 15, wherein the light source is at a first distance from the light sensor, the first color light is a blue light, and when the first distance is 100 cm, the system for detecting an illuminance further comprises a calculation unit is coupled to the signal output module, the method for detecting an illuminance further comprises:
calculating, by the calculation unit, a percentage of an illuminance when the light sensor is at a second distance relative to an illuminance when the light sensor is at the first distance according to the following equation (3);

$$I_B = 15.739 + \frac{828976.281}{L^2} \quad \text{Equation (3)}$$

wherein $I_B$ is the distance illuminance percentage, and $L$ is the second distance.

19. The method for detecting an illuminance according to claim 15, wherein the light source is at a first angle relative to a normal line of the sensing face, the first color light is a red light, and when the first angle is 0, the system for detecting an illuminance further comprises a calculation unit coupled to the signal output module, the method for detecting an illuminance further comprises:
calculating, by the calculation unit, a rotation illuminance percentage of an illuminance when the light sensor rotates with respect to the light source for a second angle relative to an illuminance when the light sensor is at the first angle according to the following equation (4);

$$I_R = -4.34778 + 103.828 \times \cos \theta_R \quad \text{Equation (4)}$$

wherein $I_R$ is the rotation illuminance percentage, and $\theta_R$ is the second angle.

20. The method for detecting an illuminance according to claim 15, wherein the light source is at a first angle relative to a normal line of the sensing face, the first color light is a green light, and when the first angle is 0, the system for detecting an illuminance further comprises a calculation unit coupled to the signal output module, the method for detecting an illuminance further comprises:
calculating, by the calculation unit, a rotation illuminance percentage of an illuminance when the light sensor rotates with respect to the light source for a second angle relative to an illuminance when the light sensor is at the first angle according to the following equation (5);

$$I_G = 3.27932 + 89.885 \times \cos \theta_R \qquad \text{Equation (5)}$$

wherein $I_G$ is the rotation illuminance percentage, and $\theta_R$ is the second angle.

21. The method for detecting an illuminance according to claim 15, wherein the light source is at a first angle relative to a normal line of the sensing face, the first color light is a blue light, and when the first angle is 0, the system for detecting an illuminance further comprises a calculation unit coupled to the signal output module, the method for detecting an illuminance further comprises:

calculating, by the calculation unit, a rotation illuminance percentage of an illuminance when the light sensor rotates with respect to the light source for a second angle relative to an illuminance when the light sensor is at the first angle according to the following equation (6);

$$I_B = 0.15324 + 99.018 \times \cos \theta_R \qquad \text{Equation (6)}$$

wherein $I_B$ is the rotation illuminance percentage, and $\theta_R$ is the second angle.

22. The method for detecting an illuminance according to claim 15, wherein the light source is at a first angle relative to a normal line of the sensing face, the first color light is a red light, and when the first angle is 0, the system for detecting an illuminance further comprises a calculation unit coupled to the signal output module, the method for detecting an illuminance further comprises:

calculating, by the calculation unit, a revolution illuminance percentage of an illuminance sensed by the light sensor when the light source revolves with respect to the light sensor for a second angle relative to an illuminance when the light sensor is at the first angle according to the following equation (7);

$$I_R = 8.136 + 96.722 \times \cos \theta_S \qquad \text{Equation (7)}$$

wherein $I_R$ is the revolution illuminance percentage, and $\theta_S$ is the second angle.

23. The method for detecting an illuminance according to claim 15, wherein the light source is at a first angle relative to a normal line of the sensing face, the first color light is a green light, and when the first angle is 0, the system for detecting an illuminance further comprises a calculation unit coupled to the signal output module, the method for detecting an illuminance further comprises:

calculating, by the calculation unit, a revolution illuminance percentage of an illuminance sensed by the light sensor when the light source revolves with respect to the light sensor for a second angle relative to an illuminance when the light sensor is at the first angle according to the following equation (8);

$$I_G = 24.338 + 89.349 \times \cos \theta_S \qquad \text{Equation (8)}$$

wherein $I_G$ is the revolution illuminance percentage, and $\theta_S$ is the second angle.

24. The method for detecting an illuminance according to claim 15, wherein the light source is at a first angle relative to a normal line of the sensing face, the first color light is a blue light, and when the first angle is 0, the system for detecting an illuminance further comprises a calculation unit coupled to the signal output module, the method for detecting an illuminance further comprises:

calculating, by the calculation unit, a revolution illuminance percentage of an illuminance sensed by the light sensor when the light source revolves with respect to the light sensor for a second angle relative to an illuminance when the light sensor is at the first angle according to the following equation (9);

$$I_B = -1.44975 + 108.755 \times \cos \theta_S \qquad \text{Equation (9)}$$

wherein $I_B$ is the revolution illuminance percentage, and $\theta_S$ is the second angle.

* * * * *